United States Patent
Snyder

(10) Patent No.: US 8,562,355 B2
(45) Date of Patent: Oct. 22, 2013

(54) SYSTEM AND METHOD FOR GUIDING NEXT STEP ADAPTIVE BEHAVIOR

(76) Inventor: Thomas E. Snyder, Wellesley Hills, MA (US)

(*) Notice: Subject to any disclaimer, the term of this patent is extended or adjusted under 35 U.S.C. 154(b) by 1120 days.

(21) Appl. No.: 12/287,524

(22) Filed: Oct. 10, 2008

(65) Prior Publication Data

US 2009/0246745 A1 Oct. 1, 2009

Related U.S. Application Data

(60) Provisional application No. 60/979,592, filed on Oct. 12, 2007.

(51) Int. Cl.
*G09B 19/00* (2006.01)

(52) U.S. Cl.
USPC .......................................................... 434/236

(58) Field of Classification Search
USPC ........................................................... 434/236
See application file for complete search history.

(56) References Cited

U.S. PATENT DOCUMENTS

| 4,931,934 | A | 6/1990 | Snyder |
| 6,497,577 | B2 | 12/2002 | Kanter |
| 6,650,251 | B2 | 11/2003 | Gerrity |
| 6,658,391 | B1 * | 12/2003 | Williams et al. ............ 705/7.32 |
| 7,121,830 | B1 * | 10/2006 | Kaplan et al. ................ 434/219 |
| 2005/0170321 | A1 * | 8/2005 | Scully ........................... 434/219 |
| 2007/0117072 | A1 * | 5/2007 | Adjali et al. ................. 434/236 |

OTHER PUBLICATIONS

International Search Report and Written Opinion, International Patent Application No. PCT/US08/79522, mailed Dec. 24, 2008 (7 pages).

* cited by examiner

*Primary Examiner* — Xuan Thai
*Assistant Examiner* — Jerry-Daryl Fletcher
(74) *Attorney, Agent, or Firm* — Wilmer Cutler Pickering Hale and Dorr LLP

(57) ABSTRACT

The system and method of the present invention process clarified emotional response data in order to guide next step adaptive behavior. Emotional responses with predetermined clarified intensities are sorted. The best quality clarified intensity or intensities are then selected as the 'heart of the matter', which is then shown to a user to reveal how the user is most uniquely responding to a particular subject or issue. The user is then given guidance on how to respond to the particular subject or issue thereby guiding the user's behavior in response to such subject or issue.

8 Claims, 5 Drawing Sheets

SYSTEM AND METHOD FOR GUIDING NEXT STEP ADAPTIVE BEHAVIOR

CROSS REFERENCE TO RELATED APPLICATION

This application claims benefit of Provisional Application Ser. No. 60/979,592 filed on Oct. 12, 2007.

BACKGROUND OF THE INVENTION

This invention relates to a system and method for processing and directing responses to emotions and more particularly to a system and method for guiding the next step adaptive behavior of an individual.

Personal decision making, and living life in general, is practiced as art not science. Individuals frequently falter and fail in striving for satisfaction, meaning, and fulfillment. Personal and social progress is slow. Ineffectiveness and inefficiency in decision making, and in relating to and communicating with others and even oneself, are prevailing and critical social problems.

On the other hand, people tend to believe in themselves and, at times, people in general. Many imagine, advocate, and seek a deeper level of relationship and communication with other people and themselves. Beyond everyday reflections, meditations, conversations, dialogues, brainstormings and debates, many seek guidance from the self-help resources available, including books, tapes, reality entertainment, internet search engines, coursework, seminars, and retreats. Many also seek guidance from professional counselors and coaches.

However, one fundamental set of obstacles stands in the way of the above, widespread, natural, but typically flawed and even doomed endeavors. Consciousness is not up to the task. Consciousness commonly overthinks and underthinks, overfeels and underfeels, and overacts and underacts. Consciousness cannot easily, accurately, or reliably see subconsciousness. This is unfortunate but due to two important realities: (1) uncontrolled, irrelevant emotional biases dull and retard consciousness and conscious self-report, and (2) the personal truth for each individual exists at the level of subconsciousness.

While personal truths are the golden fleece and brass ring for which to strive, understanding and accounting for the uncontrolled, irrelevant emotional biases residing within each individual is equally important if one wished to set up a system and method to guide next step adaptive behavior.

These uncontrolled, irrelevant emotional biases are caused by environmental clutter, interpersonal noise, and the individual respondent's own baseline personality state (mood) and trait (temperament) emotionality at the time of his or her response. These biases, particularly the latter, are typically overlooked in ordinary efforts to determine the truths within individuals. These biases block deep, whole, true insight generation, and thus dull and retard personal decision making, relationship building, and resolution of communication gaps.

U.S. Pat. No. 4,931,934 issued to Snyder describes a system and method for clarifying emotional responses by removing extraneous (motivationally irrelevant) biases which otherwise dominate emotional responses and consciousness itself. Such clarified emotional responses are currently being aggregated and collated for understanding populations and teams, respectively. Another possible use of clarified emotions is to use such information about emotions to understand and guide the future behavior of individuals. For example, such information could be used to help an individual decide how to act in a particular situation faced by the individual. An example of potential use of this system and method could be a case of a good man with many near relatives who is challenged to figure out what to do with the extended family's deceased grandfather's farm, which he has inherited and lives on as his primary residence. The question is 'How does SELLING THE FARM make you feel?'

An interactive process to engage and guide people in the generation of insight to motivate and inspire next step adaptive behavior would be a useful tool for people in many walks of life. If such a tool is made available on the internet, the inherent versatility and scalability of technology, coupled with the inherent actionability of the information herein described, means such a system and method can: (1) offer access to the widest range of people; (2) engage men and women, young and old, educated and uneducated, in any language; (3) support a wide range of personal applications; (4) supply archive and retrieval services; (5) ensure security, privacy, and confidentiality, along with authorized access to personal results; and (6) support two-person dialogues around results and recorded insights.

It is therefore the principal object of the present invention is to provide a system and method to guide next step adaptive behavior.

It is further object of the present invention to convert clarified emotional responses into information which can be used to guide next step adaptive behavior.

SUMMARY OF THE INVENTION

The system and method of the present invention process clarified emotional response data in order to guide next step adaptive behavior. Emotional responses with predetermined clarified intensities are sorted. The best quality clarified intensity or intensities are then selected as the 'heart of the matter', which is then shown to a user to reveal how the user is most uniquely responding to a particular subject or issue. The user is then given guidance on how to respond to the particular subject or issue thereby guiding the user's behavior in response to such subject or issue.

These and other features and of the present invention will be more fully understood from the following detailed description which should be read in light of the accompanying drawings in which corresponding reference numerals refer to corresponding parts throughout the several views.

DETAILED DESCRIPTION OF PREFERRED EMBODIMENTS

Given the above context, the system and method of the present invention for guiding next step adaptive behavior rests on several fundamental assumptions of human nature. (1) Personal truths lie within each individual. (2) Individuals by nature wish to express these truths. (3) Individuals can express these truths through projection, an exercise in which subconscious thoughts and feelings can be expressed in response to ambiguous stimuli like a shadow or an inkblot. (4) When individuals discover previously unappreciated subconscious truths, 'aha!' insight is generated and with it new energy to inspire and motivate next step adaptive behavior. (5) This 'heart of the matter' information is more valuable in guiding next step adaptive behavior than 'top of mind' information more familiar to consciousness. And (6), the phenomenological and structural nature of the emotion at the 'heart of the matter' can be deconstructed to provide specific guidance to inspire and motivate the next step to take with regard to any topic presented as 'How does ANY TOPIC make you feel?'

The system and method of the present invention for guiding next step adaptive behavior is grounded in clarified emotional responses expressed by the individual. Such clarified emotional responses can be generated in the manner described in U.S. Pat. No. 4,931,934, the teachings of which are incorporated herein by reference.

Figure 1:
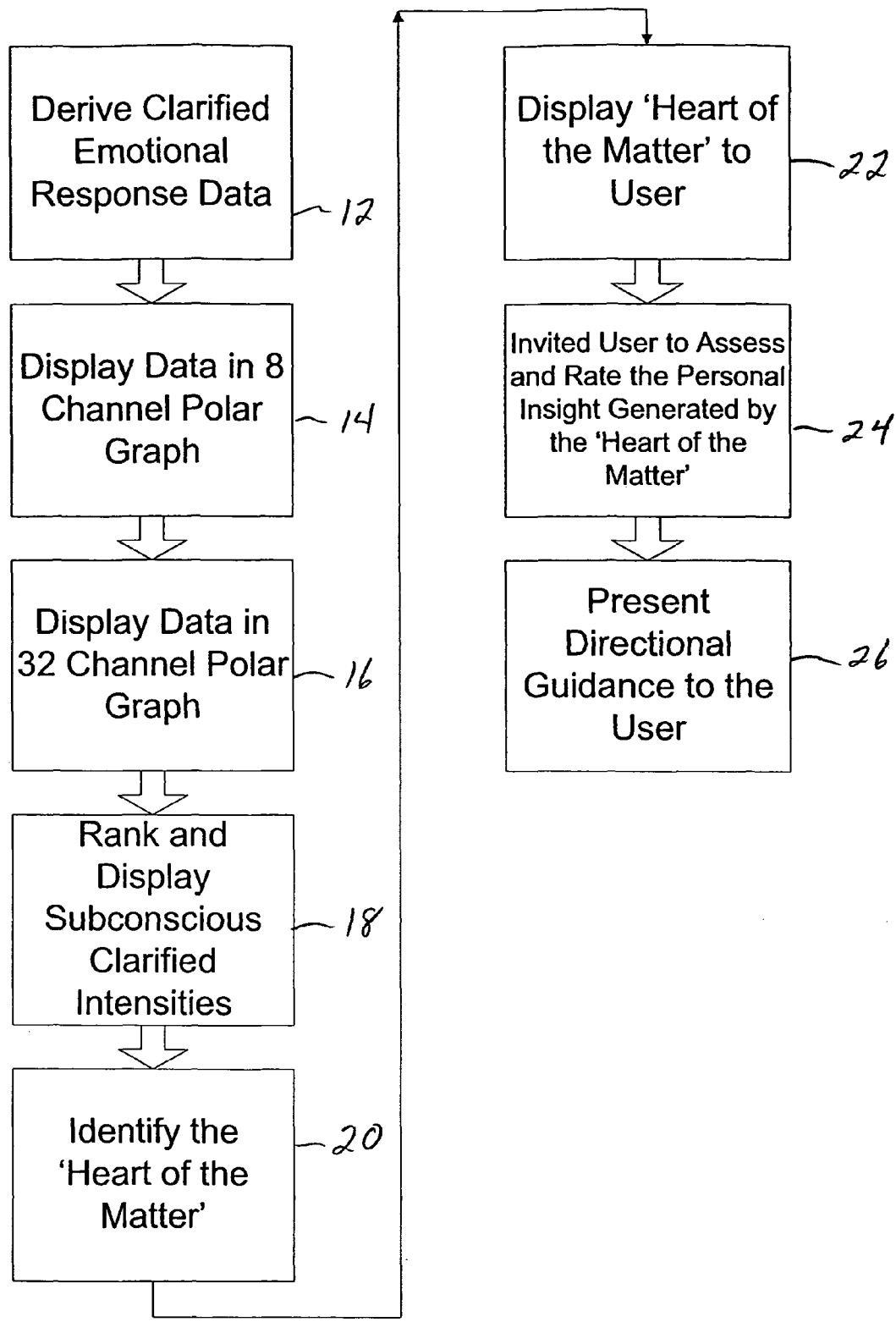
FIG. 1 is a flow chart of the steps utilized by the process of the present invention for processing clarified emotions.
Figure 2:
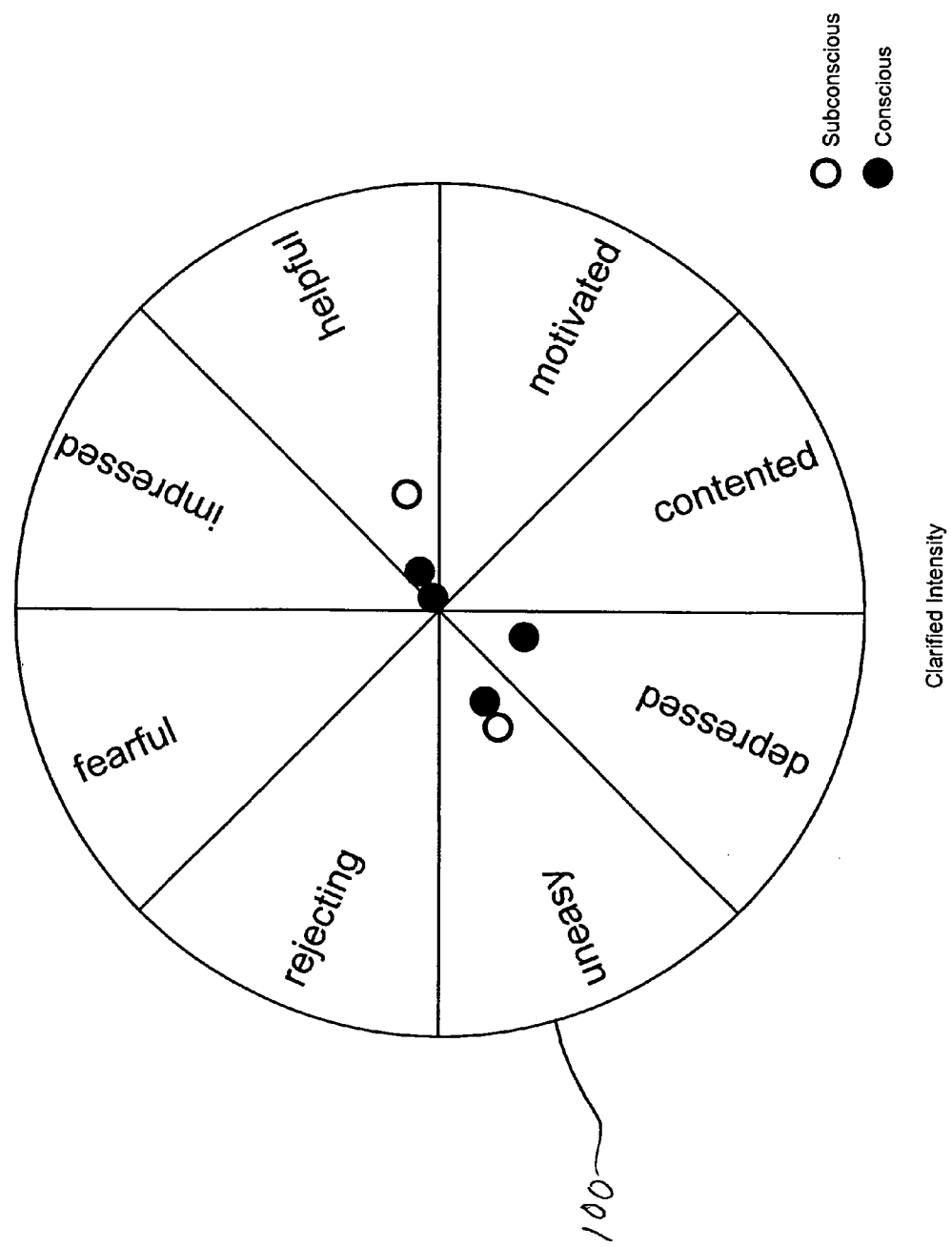
FIG. 2 is a graph of clarified emotional responses broken out into eight categories of emotions.
Figure 3:
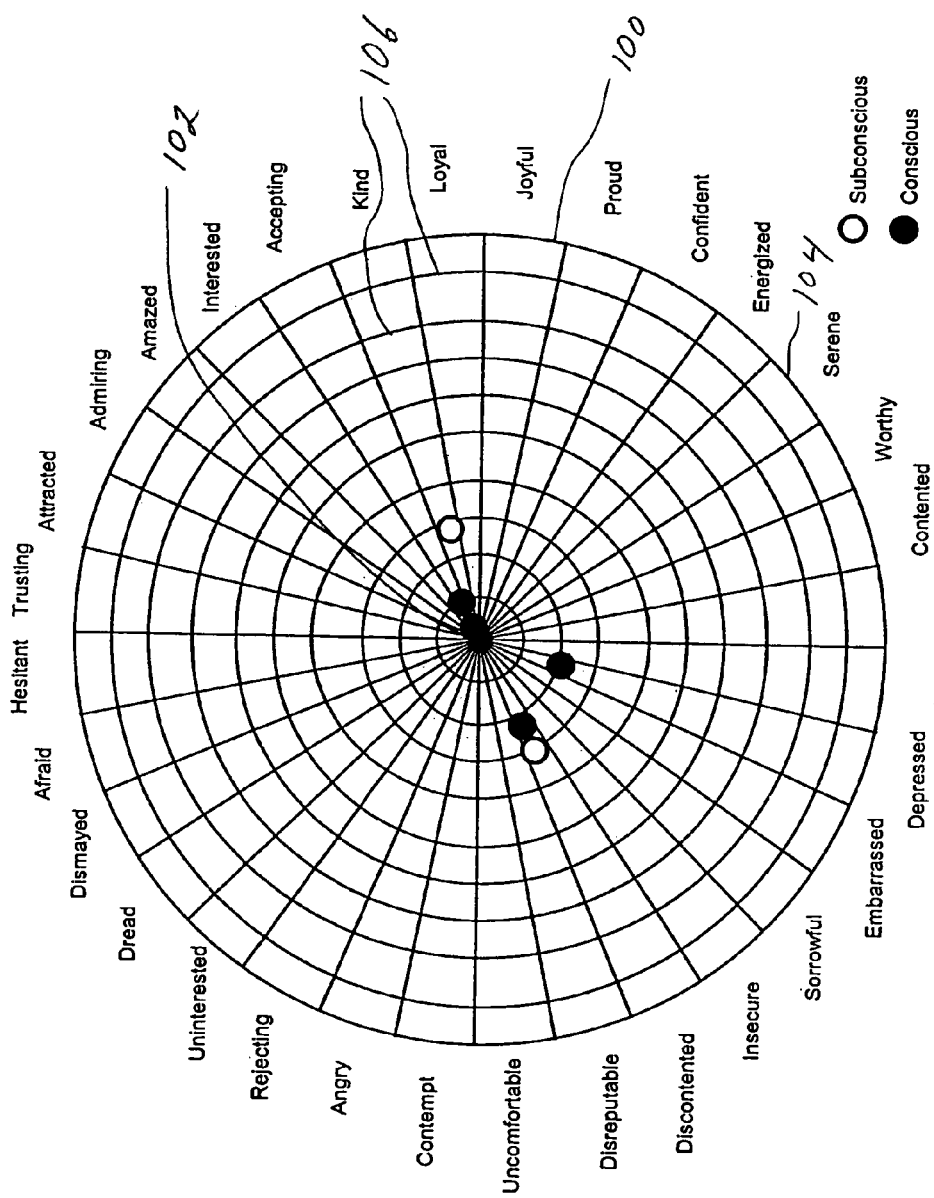
FIG. 3 is a graph of clarified emotional responses broken out into thirty-two categories of emotions.

Referring now to FIG. 1, the clarified emotional response data is derived in step 12, and in steps 14 and 16 such data is displayed on a polar graph 100 as shown in FIG. 2 and FIG. 3. This polar graph 100 is demarcated in clarified intensities ranging from 0 at the center 102 to 20 at the outmost concentric circle 104 on the grid. In the graph of FIG. 2, the circular demarcation lines are not shown, but would be identical to the circular demarcation lines 106 shown in FIG. 3. Each demarcation line represents two data points so that clarified emotions will range from 0 to 20. Clarified emotion values that are negative numerical values are graphed in the region of opposite emotion. For example, a clarified intensity of 5 for the emotional response Secure is displayed one quarter of the way from the center to the perimeter of the polar graph in the area for Secure. On the other hand, if the clarified intensity for Secure is −5, then the data point would be displayed one quarter of the way from the center to the perimeter of the polar graph in the area for Insecure.

When the baseline intensity of a clarified emotion is 0 or a negative number (meaning the baseline intensity recorded for that emotional response was between 0 and −10), the data point is operationally defined as a subconscious response (meaning less biased, more unique and more subconscious than the conscious responses described below). When the baseline is equal to or exceeds the response intensity then the data point is operationally defined as a predisposition response (overwhelmingly biased, not at all unique, not at all subconscious). All other data points that are in between are operationally defined as conscious responses (meaning more biased, less unique and more conscious than the subconscious responses described above). That a conscious emotional response is operationally defined and found to be more biased, less unique, and more conscious than a subconscious response means that whatever the clarified intensity of the conscious response (a positive number), it is partly contributed to by a positive (biasing, familiar-to-consciousness-though-irrelevant) baseline intensity. On the other hand, a subconscious emotional response is always operationally defined by a 0 or negative baseline intensity, meaning that the response is not biased (the emotion does not show up as net positive in the timed graph determination of baseline intensity).

Radial placement of the data points is determined according to a model that utilizes all the emotion words representing feelings in a language. Over 4000 emotion words exist in the English language. The model is four dimensional. While the polar graph is two dimensional on paper, its 32 labels represent 4 dimensions that are structurally embedded in the 2 dimensions. A given emotional word is either pleasant or unpleasant, outwardly directed or inwardly directed, actively committing or passively assessing, and finally passionate (sublime or extreme) or dispassionate (common or mundane). For example, in the 8 channel emotion area Motivated, the sublime emotion represented is Joyful, the extreme emotion represented is Proud, the common emotion represented is Confident, and the mundane emotion represented is Energized. For their opposite negative emotions, in the 8 channel emotion area Depressed, the sublime emotion represented is Sorrowful, the extreme emotion represented is Embarrassed, the common emotion represented is Depressed, and the mundane emotion represented is Tired. Sublime emotions typically relate to experiencing something, extreme emotions typically relate to leading something, common emotions typically relate to sharing something, and mundane emotions typically relate to valuing something. As a result, the 8 channel model shown in FIG. 2 can be further divided into 32 dimensions or channels of emotion shown in FIG. 3. The 8 channel model of emotional data is generally displayed first because its 8 summarizing labels—impressed, helpful, motivated, contented, fearful, rejecting, uneasy, depressed—are simplified and popular enough for the individual to most easily begin to recognize his or her story in the portrayed data. In view of the fact that engagement and transformation of the individual is all important in the method and system of the present invention, this step of presenting a visual display of emotional results in these simplified channels is the best way to ensure and help the individual transition, perhaps, from common fear, cynicism, skepticism and doubt regarding the results to curiosity, intrigue, openness, mirth, insight and imagination regarding the implications of the results for next step adaptive behavior.

The individual's data points are also displayed in the more fully dimensionalized 32 channel model shown in FIG. 3. The emotion labels of the 32 channels enable more precise recognition of the individual's personal story. The more refined information conveys detail where previously existed only overwhelming complexity. Of greater importance, the 32 channel model establishes the basis for the guidance described below that are at the core of the system and method of the present invention.

The placement of emotion words in the emotion model behind the polar graph was done intuitively based on extension of the classical, academic, and scientific work that has preceded this model. It is certainly possible to alter the labels shown in FIGS. 2 and 3, but the model itself would not change. The model that serves as the output grid for this system and method is programmed to recognize any recognizable emotional response and record it in the appropriate area of the model. If a response word is not recognized by the model—the emotion word is misspelled, or the word is not an emotion word, or the response is a phrase made up of two or more words, or the word is an emotion word not yet programmed into the model—then the respondent can re-type or go to a visual tree of the most common emotion words to find the emotion word that most closely captures the feeling felt.

Work on the structural phenomenology of emotion can be traced from classical times when it was reasoned there are 7 basic emotions in human nature: fear, greed, envy, happy, anger, sorrow, and surprise. In 1986 Ekman (A new pan cultural facial expression of emotion, *Motivation and Emotion,* 10(2)) confirmed the universality of these classical emotions in finding that the facial depiction of these emotions could be recognized to represent the same feelings in many cultures around the globe. Elaboration of the structural phenomenology of emotions began with Mehrabian and Russell in 1974 (An approach to environmental psychology, Cambridge Mass., MIT Press), and continued with contributions, developments, and refinements offered by deRivera in 1977 (A structural theory of the emotions, New York, International Universities Press), Plutchik in 1980 (Emotion: A psycho-evolutionary synthesis, New York, Harper & Row), and Holbrook and O'Shaughnessy in 1984 (The role of emotion in advertising, *Psychology and Marketing*, 1(2)). The latter groups reported validations of three-dimensional versions of the model by semantic differential and real world advertising assessment methodologies, respectively.

One example of how the overall model is constructed is the following: calm, relaxed and peaceful might be emotional responses expressed by three different people. However, all three emotions are phenomenologically identical in the structural model of emotion embedded in this system and method. That is, all three emotions are pleasant, all are in the 8 channel model area labeled Contented, and all are in the 32 channel model area labeled Serene. In each 8 channel model area there are four 32 channel model areas. For example, in the 8 channel model area Contented, Serene is phenomenologically and structurally coupled with Worthy, Contented and Secure. It is the 32 channel model that provides the necessary and sufficient differentiation required to produce actionable value in population segment and organizational group applications, and the same is expected to be true for individual applications addressed by this system and method.

In step 18, the subconscious clarified intensities associated with the 6 to 8 emotional responses in an individual's response profile are ranked and displayed high to low. Once this is completed, only the subconscious data points are processed (or only the conscious data points if there happen to be no operationally defined subconscious data points present) to identify and Highlight the 'heart of the matter' in step 20. As described above, the 'heart of the matter' is comprised of one or more emotional responses above the highest threshold established in the manner described below to separate the most salient, least biased, most unique, most subconscious (even if derived from only conscious data points) emotional responses the individual has expressed to the question 'How does ANY TOPIC make you feel?'

The system and method of the present invention work on the range of possible clarified intensities 20 to −9 described in the U.S. Pat. No. 4,931,934 issued to Snyder. 1 or 2 or 3 (or up to 8) actual clarified intensity numbers are used in order to highlight the 'heart of the matter'. The threshold for the 'heart of the matter' is established by mathematically identifying the top number or numbers that also represent the smallest set that can be separated from the remaining numbers to which the process is applied. The purpose is to mathematically and visually provide the strongest, simplest evidence to make the most compelling case to the individual respondent that the 'heart of the matter' is the most unappreciated but recognizable emotional core of his or her response to 'How does ANY TOPIC make you feel?' and is the necessary and sufficient core of information to focus on to inspire and motivate next step adaptive behavior.

Figure 5:
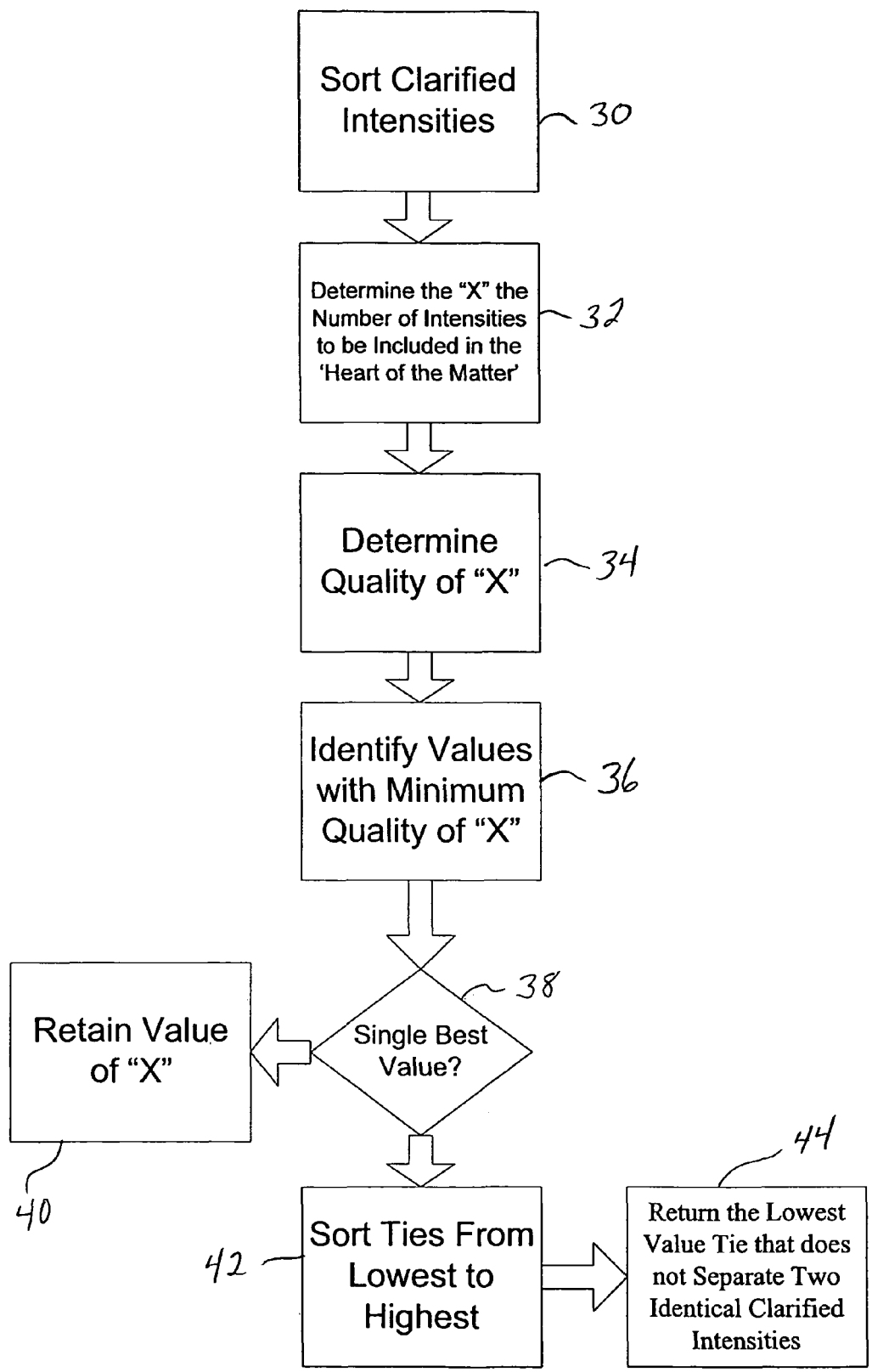
FIG. 5 is a flow chart of the process for determining the 'heart of the matter' used by the system and method of the present invention

Referring to FIG. 5, the system and method determine the 'heart of the matter' from a set of n clarified intensities, sorted from highest to lowest in step 30. In step 32, the system and method determine the value x, between 1 and n−1, that best indicates how many of the n intensities should be considered part of the 'heart of the matter'.

1. For each possible value of x, a "quality value" is calculated in step 34 as shown below. The lower the quality value, the better.
2. The value or values of x that have the best (minimum) quality value are then identified in step 36.
3. If it is determined in step 38 that there is a single value of x attaining the best quality value, then that value is retained in step 40.
4. In the case of a tie (multiple values of x attaining the best quality value):
   a. Sort the tied values in step 42 from lowest to highest to find the lowest and highest value of x that attain the best quality value ("lowest tie" and "highest tie")
   b. Searching from lowest tie to highest tie, return the first value that does not separate two identical clarified intensities in step 44, i.e., the first value x between lowest tie and highest tie such that CI(x) is not equal to CI(x+1).
   c. If there is no such value, return the highest tie.

Given $CI_i$ for 1 between 1 and n
Define for given x between 1 and n−1

$$S_{HI} = \sum_{i=x+1}^{x} CI_i$$

$$Q_{HI} = \sum_{i=1}^{x} (CI_i)^2$$

$$S_{LO} = \sum_{i=x+1}^{n} CI_i$$

$$Q_{LO} = \sum_{i=x+1}^{n} (CI_i)^2$$

Quality value $(x) = Q_{HI} - (S_{HI}^2/n) + Q_{LO} - (S_{LO}^2/(n-x))$, where S is the sum of the clarified intensities above and below the candidate dividing line and Q is the sum of the standard deviations above and below the candidate dividing line. The position of the candidate dividing line=x.

An example of the derivation of the 'heart of the matter' will further aid in the understanding of the present invention. If an individual's response profile includes clarified intensities represented by subconscious numbers 20, 18, 14 and conscious numbers 12, 11, 6, 3, 2, then 20 and 18 are identified as the 'heart of the matter'. On the other hand, in the special case with a response profile of only conscious numbers 6, 5, 4, 3, 2, 1, then 6 is identified as the 'heart of the matter'.

In the infrequent case where a subconscious number is exceeded by a conscious number, preference is given to the subconscious number in identifying the 'heart of the matter'.

Figure 4:
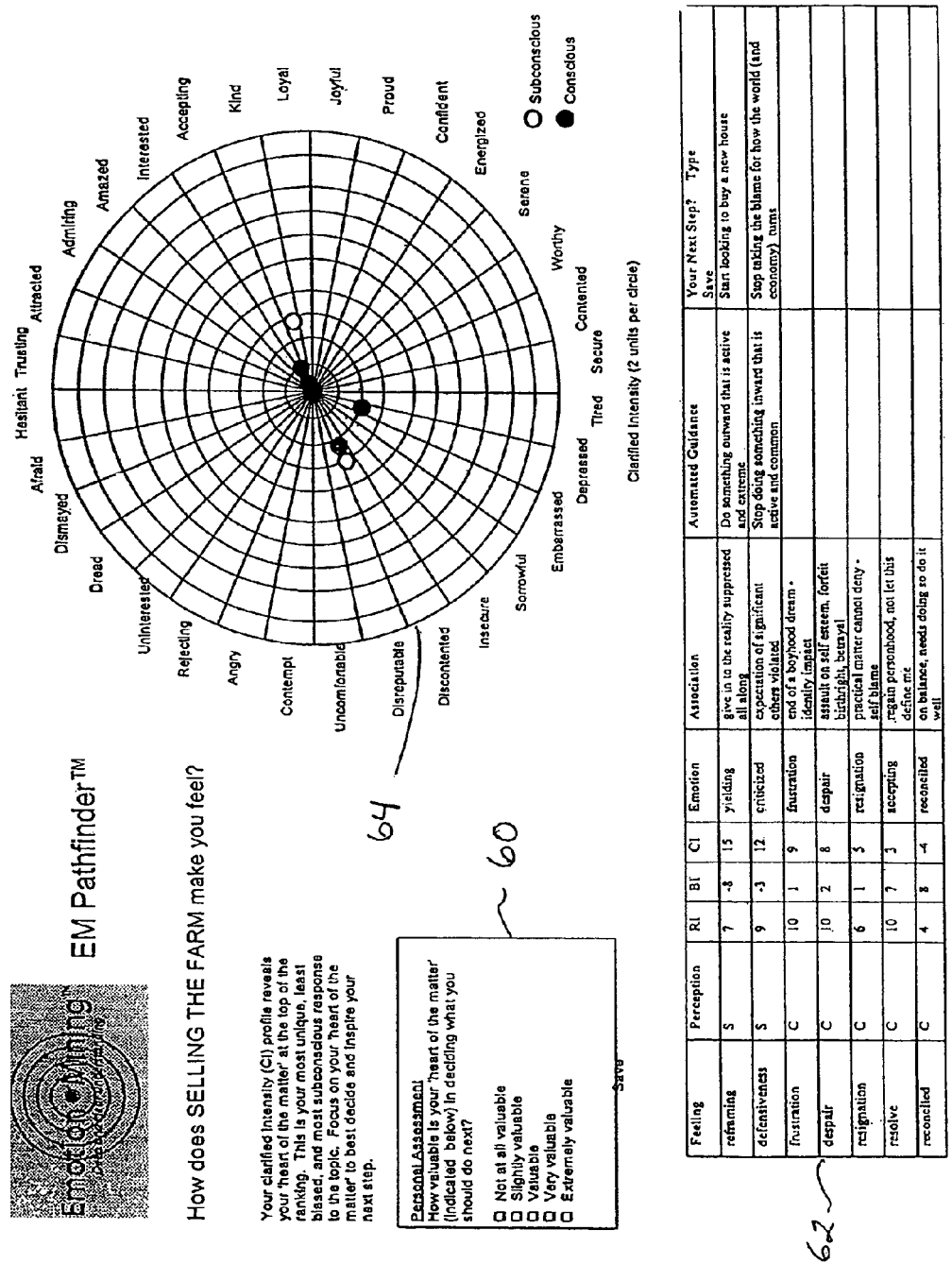
FIG. 4 is a representation of a screen display used in the system and method of the present invention.

Referring to FIG. 4, after the 'heart of the matter' is determined, it is shown to the user and highlighted (in color or otherwise) with the entire dataset shown in table 62 and graph 64 (see table below): original feeling, designated perception (subconscious, conscious or predisposition), response intensity (RI) (1 to 10), baseline intensity (BI) (−10 to 10), clarified intensity (CI) (−9 to 20), final emotion word (sometimes the same as the original feeling), and association phrase. The 'heart of the matter' is composed of at least one, often two, sometimes three, or rarely even more (even up to all eight) rows of data. It is the 'heart of the matter' that is now meant to consume essentially all of the individual's attention to generate insight(s) to inspire and motivate next step adaptive behavior.

After the dataset is shown to the individual, the individual is invited to assess and rate the value of the personal insight (the size of the 'aha!') generated by the 'heart of the matter' in box 60. This rating is especially made in comparing the information at the bottom of the ranking which typically represents more biased, conscious, familiar, commonplace, rational, top of mind information.

This assessment uses a simple 5 point Likert scale such as: 1 not at all valuable, 2 somewhat valuable, 3 valuable, 4 very valuable, or 5 extremely valuable. Making this assessment serves as another step in engaging and transforming the individual, that is, opening and preparing the individual's conscious self for the behavioral guidance, emotional preparedness, and social readiness soon to be a realized and acted upon in an adaptive matter.

After the individual allows the first wave of insight to settle around the identification, discovery, and evaluation (and perhaps already emerging implications) of the 'heart of the matter', the individual is presented the option to click to reveal the directional guidance pertaining to each emotion and row of data in the highlighted 'heart of the matter'.

Directional guidance is based on the structural model of emotions previously described. Phenomenological deconstruction of the structural model of emotions permits the positing of automated word labels which are universal, fundamental, simple and recognizable enough to be helpful as directional guidance in this system and method. A directional guidance label is assigned to each of the 32 channels and pertains for all of the emotions in each of the 32 channels.

If a pleasant emotion is at the 'heart of the matter', then the next step in adaptive behavior is to 'do' something. If an unpleasant emotion is at the 'heart of the matter', then the next step in adaptive behavior is to 'stop doing' something.

If an outward directed emotion is at the 'heart of the matter', then the next step in adaptive behavior is to do something in relation to an external person, thing, or event. If an inward directed emotion is at the 'heart of the matter', then the next step in adaptive behavior is to do something in relation to one's internal condition.

If an actively committing emotion is at the 'heart of the matter', then the next step in adaptive behavior is to do something that amounts to committing to new behavior. If a passively assessing emotion is at the 'heart of the matter', then the next step in adaptive behavior is to do something that amounts to further reflection.

Finally, if a sublime emotion is at the 'heart of the matter', then the next step in adaptive behavior is to do something 'sublime as in experiencing something'. If an extreme emotion is at the 'heart of the matter', then the next step in adaptive behavior is to do something 'extreme as in leading something'. If a common emotion is at the 'heart of the matter', then the next step in adaptive behavior is to do something 'common as in sharing something'. If a mundane emotion is at the 'heart of the matter', then the next step in adaptive behavior is to do something 'mundane as in valuing something'.

For example, a final emotion word that is pleasant, outward directed, actively committing, and extreme dictates that the guidance sentence is 'Do something outward that is active and extreme as in leading something'. On the other hand, a final emotion word that is unpleasant, inward directed, actively committed, and common dictates that the guidance sentence is 'Stop doing something inward that is active and common as in sharing something'.

The guidance sentence(s) is (are) offered to stimulate specific insight(s) into what next adaptive step to take with regard to the topic. Because the terms in the guidance sentences are necessarily automated, universal, fundamental, simple and only, perhaps, recognizable enough, practical definitions and descriptions of how to think about and use these terms are provided as popup help.

For example, if the individual were to click on outward in the above example, then the following popup message would appear: 'Outward refers to doing something outward directed, like considering the world of people, things and events going on around you'. Similarly, for inward, 'Inward refers to doing something inward directed, like considering the condition of your mind, heart and body going on within you'.

Likewise, for active, 'Active refers to doing something actively committing, like considering becoming more actively involved in something than you are at present'. Similarly, for passive, 'Passive refers to doing something passively assessing, like considering being more thoughtful and reflective before becoming more involved with or in something'.

Again likewise, 'Sublime as in experiencing something refers to doing something sublime, like considering the overall quality of an experience'. Similarly, 'Extreme as in leading something refers to doing something extreme, like considering taking the lead in advancing a cause'. Similarly, 'Common as in sharing something refers to doing something common, like considering what you have in common with other people'. Finally, similarly, 'Mundane as in valuing something refers to doing something mundane, like considering the emotional resources you value and have available'.

As automated and formalized as the directional guidance needs to be, it is important to realize the labels, words, and explanations offered are generalizations at best and therefore are not expected to speak to, and be helpful to, all individuals in all circumstances at all times.

To crystallize and memorialize the beneficial outcome of the present system and method, the individual is lastly provided a limited space to type his or her imagined next step pertaining to each emotion in the highlighted 'heart of the matter'. Because this activity can spawn additional thoughts, ideas, insights, implications, and action possibilities which are personally valuable to record, expandable space is provided to type these additional reflections.

With perhaps the entire sequence of fear, cynicism, skepticism, doubt, curiosity, intrigue, openness, mirth, insight, and imagination traversed, the individual can click 'Save' to save his or her next step and additional reflection information. This information can later be reviewed for purposes of further insight generation, self understanding, decision making, action taking, and personal development.

While the foregoing invention has been described with reference to its preferred embodiments, various alterations and modifications will occur to those skilled in the art. All such variations and modifications are intended to fall within the scope of the appended claims.

What is claimed is:

1. A method for guiding next step adaptive behavior of an individual comprising the steps of:
    utilizing a processor programmed to:
        generate clarified emotional responses to an event experienced by the individual;
        separate said clarified emotional responses into conscious and subconscious clarified emotional responses;
        rank said clarified emotional responses;
        determine at least one least biased and most subconscious emotional response from said ranked clarified emotional responses by:
            sorting intensities of said clarified emotional responses, determining the number of said at least one least biased and most subconscious responses that are relevant for determining a heart of the matter, calculating a quality value for each of said intensities, selecting the intensity with the best quality value as a least biased and most subconscious emotional response;

displaying on a computer output device guidance to the individual based on said at least one least biased and most subconscious emotional response.

2. The method for guiding next step adaptive behavior of an individual of claim 1 wherein said step of separating said clarified emotional responses into conscious and subconscious clarified emotional responses further comprises displaying clarified intensity data in an 8 channel polar graph.

3. The method for guiding next step adaptive behavior of an individual of claim 1 wherein said step of separating said clarified emotional responses into conscious and subconscious clarified emotional responses further comprises displaying clarified intensity data in a 32 channel polar graph.

4. The method for guiding next step adaptive behavior of an individual of claim 1 wherein said step of providing guidance to the individual based on said at least one least biased and most subconscious emotional response further comprises:

causing the individual to assess and rate the value of the at least one least biased and most subconscious emotional response; and allowing the individual to elect to receive directional guidance for each emotion associated with said at least one least biased and most subconscious emotional response.

5. A system for guiding next step adaptive behavior of an individual comprising;

a processor;

an input device for enabling the individual to provide emotional responses to an event experienced by the individual;

said processor (a) generating clarified emotional responses from said provided emotional responses, (b) separating said clarified emotional responses into conscious and subconscious clarified emotional responses, (c) ranking said clarified emotional responses, (d) determining at least one least biased and most subconscious emotional response from said ranked clarified emotional responses by (i) sorting intensities of said clarified emotional responses, (ii) determining the number of said at least one least biased and most subconscious responses that are relevant for determining a heart of the matter, (iii) calculating a quality value for each of said intensities, (iv) selecting the intensity with the best quality value as a least biased and most subconscious emotional response, (e) providing guidance to the individual based on said at least one least biased and most subconscious emotional response.

6. The system for guiding next step adaptive behavior of an individual of claim 5 further comprising a display for presenting to the individual clarified intensity data in an 8 channel polar graph.

7. The system for guiding next step adaptive behavior of an individual of claim 5 further comprising a display for presenting to the individual clarified intensity data in a 32 channel polar graph.

8. The system for guiding next step adaptive behavior of an individual of claim 5 wherein said input device receives assessment and rating of the value of the personal insight of at least one least biased and most subconscious emotional response; and wherein said display presents the individual with directional guidance for each emotion associated with said at least one least biased and most subconscious emotional response.

* * * * *